United States Patent [19]

Kedem et al.

[11] Patent Number: 5,152,904
[45] Date of Patent: Oct. 6, 1992

[54] WATER SOFTENING PROCESS

[75] Inventors: Ora Kedem, Rehovot; Jonathan Ben-Dror, Doar Netanya, both of Israel

[73] Assignees: Yeda Research and Development Co., Ltd., Rehovot; Sor-Van Radiation Ltd., Yavne, both of Israel

[21] Appl. No.: 642,207

[22] Filed: Jan. 16, 1991

[51] Int. Cl.⁵ .................................. C02F 1/52
[52] U.S. Cl. .................... 210/711; 210/713; 210/714; 210/724; 210/738
[58] Field of Search ............. 210/713, 714, 724, 726, 210/738, 737, 711

[56] References Cited

U.S. PATENT DOCUMENTS

| | | | |
|---|---|---|---|
| 3,583,910 | 6/1971 | Stoddard | 210/713 |
| 3,976,569 | 8/1976 | Sheppard et al. | 210/714 |
| 4,207,183 | 6/1980 | Herrigel | 210/711 |
| 4,209,395 | 6/1980 | Berlenbach et al. | 210/714 |
| 4,670,150 | 6/1987 | Hsiung et al. | 210/728 |

FOREIGN PATENT DOCUMENTS

485667  8/1952  Canada .................. 210/714

*Primary Examiner*—Peter Hruskoci
*Attorney, Agent, or Firm*—Helfgott & Karas

[57] ABSTRACT

Process for softening hard water by precipitation of calcium carbonate. The hard water is rendered alkaline, e.g. by the addition of sodium hydroxide, and is then contacted with a large excess of calcium carbonate crystals whose size does not exceed 100 microns, whereby precipitation occurs within a short contact time of the order of 2–60 seconds. Upon separation of soft water from calcium carbonate the bulk of the latter is recirculated and excessive amounts are removed.

7 Claims, 5 Drawing Sheets

WATER SOFTENING PROCESS

FIELD OF THE INVENTION

The present invention concerns softening of hard water by the removal therefrom of calcium values in the form of a calcium carbonate precipitate, and provides a method suitable for both industrial and domestic applications.

BACKGROUND OF THE INVENTION AND PRIOR ART

Softening of hard water by the removal of calcium values therefrom is required for both industrial and household use to decrease scale formation in equipment such as boilers, hot water pipes and appliances such as pots and kettles, and also for the decrease of detergent consumption in household machines such as dishwashers and laundry washing machines. Softening of water is, moreover, effected as a pretreatment for water desalination.

The factors to be considered in the choice of a water softening process include the raw water quality, the end use and desired quality of the soft water, the ways and costs of disposing the waste streams, ecological problems associated with the process in general and with the waste disposal in particular, and the versatility of the process and its adaptability to different processing scales.

Known water softening processes proceed either by way of ion-exchange or by way of precipitation. In the ion-exchange processes the scale forming $Ca^{2+}$ and $Mg^{2+}$ ions are exchanged for $Na^+$ and regeneration of the ion-exchange resin is achieved with a large excess of NaCl, with the regeneration effluent being a relatively concentrated aqueous solution of sodium chloride which has to be disposed. Consequently, by this method considerable amounts of sodium salts are introduced into the sewage and finally into the ground water which is ecologically undesirable. Alternatively, it is possible to use weak acid resins which exchange $H^+$ for $Ca^{2+}$ and $Mg^{2+}$ and to regenerate the spent resins with a weak acid. While this method gives rise to less pollution and is thus more attractive, it is more expensive and has the further disadvantage of yielding acidic soft water which is corrosive, and acidic effluent which for obvious reasons gives rise to ecological problems.

Precipitation has traditionally been carried out by the lime soda process in which slaked lime is added to hard water to convert water soluble calcium bicarbonate into water insoluble calcium carbonate. This process results in a sludge of high water content which is difficult to filter and requires cumbersome treatment.

According to U.S. Pat. No. 3,976,569 hard water is softened by pH controlled, selective precipitation of $CaCO_3$ to form a thin layer thereof, followed by a raise of the pH whereby magnesium hydroxide is precipitated. The resulting slurry is filtered through the first formed $CaCO_3$ layer and a satisfactory degree of softening is reported. The object of that process is to improve the filtering of the precipitated $Mg(OH)_2$, the main disadvantage being the long time requirement for completion of the precipitation which in several batch process runs varied between 19 to 22 hours and which obviously imposes long residence times.

According to a publication by A. Graveland in Aqu. 2, 80, the rate of precipitation of calcium carbonate from hard water by the addition of sodium hydroxide can be significantly improved by carrying out the crystallisation on sand or marble grains in a fluidised bed. By this method the precipitation time is drastically reduced, the residence time in the reactor being approximately 5 minutes with upward flow velocities of the water across the bed ranging between 40 and 150 m/hr. However, in the performance of this process large $CaCO_3$ grains are formed and consequently the fluidised bed forming material has to be replaced from time to time. Moreover, large size installations are required and for both these reasons this method is intrinsically unsuitable for small scale water softening operations.

It is the object of the present invention to provide an improved process for the softening of hard water by precipitation, operable both on a large, industrial and municipal scale and small, domestic scale.

SUMMARY OF THE INVENTION

It has been realised that crystallisation of calcium carbonate by mere addition of a base to natural hard water is slow in spite of over saturation because of a very slow crystal growth. This is so because with the small amount of crystals initially formed in such inherently dilute solutions, the chance of crystal growth by the deposition of ions on the already formed crystal is small.

In accordance with the present invention there is provided a process for softening hard water by the precipitation therefrom of an amount of calcium carbonate through the addition of a water soluble basic compound to produce alkaline hard water and separate withdrawal of precipitated calcium carbonate and soft water, characterised in that in a precipitation unit intimate contact is established between the alkaline hard water and circulating calcium carbonate crystals of a size not exceeding 100 microns and which are in large excess over the amount of calcium carbonate to be precipitated from the said alkaline hard water; in that in a separator unit product soft water is separated from a residual aqueous calcium carbonate slurry which latter is collected in a collector unit; and in that said circulating calcium carbonate crystals are continuously cycled between said precipitation and collector units; whereby calcium carbonate precipitation is obtained within a short contact time.

The degree of excess of the circulating calcium carbonate over the amount to be precipitated is not critical, but as a rule it will by at least a fifty fold excess.

For start up of the process according to the invention, the desired amount of calcium carbonate crystals not exceeding 100 microns and which is in large excess over the amount of calcium carbonate to be precipitated from the alkaline hard water is supplied from an extraneous source. Once the process is operational, no more extraneous calcium carbonate is required and an essentially constant amount of calcium carbonate is cycled between the precipitation and collector units with excessive amounts of calcium carbonate corresponding essentially to the precipitated amounts, being withdrawn from the operation, either continuously or intermittently.

Preferably, the size of the circulating calcium carbonate crystals is within the range of about 2 to about 20 microns.

Typically the water soluble basic compound used is the performance of the process according to the invention is a compound selected from the group of an alkali metal hydroxides, sodium carbonate and calcium hydroxide and of these sodium hydroxide is particularly preferred.

In accordance with one mode of performance of the process according to the invention the precipitation unit is a mixer vessel.

By another mode the precipitation unit is a filter coated with a layer of calcium carbonate in which the crystals have the size as specified, which layer is in the course of operation continuously or intermittently disintegrated and reconstituted by means of said circulating calcium carbonate crystals.

In the performance of the process according to the invention the amount of base is so selected that mainly calcium carbonate is precipitated with only a relative small co-precipitation of magnesium hydroxide. The process thus differs fundamentally from that described in U.S. Pat. No. 3,976,569 in that while according to the latter initially precipitated calcium carbonate is used for the retention of subsequently precipitated magnesium hydroxide with no recirculation of calcium carbonate, in accordance with the invention recirculated calcium carbonate is used for nucleation whereby the rate of crystallisation of newly formed $CaCO_3$ is significantly increased and the precipitation period is reduced from 19-22/hours to 2-60 seconds only.

The process according to the invention is also distinguished from the Graveland process disclosed in Aqu. 2, 80, in that small particles of calcium carbonate itself rather than sand or other mineral particles is used for nucleation with no need for a fluidised bed and flotation. In consequence, as distinct from the Graveland method where large size installations are required, in accordance with the present invention it is possible, if desired, to use small sized units.

The advantages obtained according to the present invention may be summed up briefly as follows:
 i) The desired degree of water softening is obtained upon very short contact or residence times of the order of a few seconds, which leads to compact economic devices with no constraints on the dimensions thereof;
 ii) Only one single reagent such as NaOH is consumed in the course of the process and the water soluble conversion products thereof remain in solution; accordingly the process does not cause any environmental and ecological problems.

The invention also provides an apparatus for use in softening hard water by precipitation therefrom of an amount of calcium carbonate through the addition of a water soluble basic compound to produce alkaline hard water and separate withdrawal of precipitated calcium carbonate and soft water, which apparatus comprises in combination reservoir means for an aqueous solution of a water soluble basic compound;

means for the ingress of feed hard water;

means for admixing said aqueous solution of a water soluble basic compound with said feed hard water to produce alkaline hard water;

a precipitation unit in which said alkaline hard water is intimately contacted with calcium carbonate crystals of a size not exceeding 100 microns and in an amount which is in large excess over the amount of calcium carbonate to be precipitated;

separator means for the separation of soft water from a residual calcium carbonate slurry;

a collector unit for the collection of said residual aqueous calcium carbonate slurry;

means for flowing said residual aqueous calcium carbonate slurry from said collector unit to said precipitation unit; and means for flowing an aqueous calcium carbonate slurry from said precipitation unit to said separator means.

By one embodiment of an apparatus according to the invention, the said precipitation unit is a mixer chamber; according to another embodiment it is in the form of filter means bearing a coating of calcium carbonate crystals of a size not exceeding 100 microns, means being provided for the continuous or intermittent disintegration and reconstitution of the said calcium carbonate coating.

DESCRIPTION OF THE DRAWINGS

In the following the performance of the process according to the invention will be described with reference to the annexed drawings which are given by way of example only and to which the performance of the invention is not limited.

In the drawings.

SPECIFIC DESCRIPTION OF THE INVENTION

Figure 1:
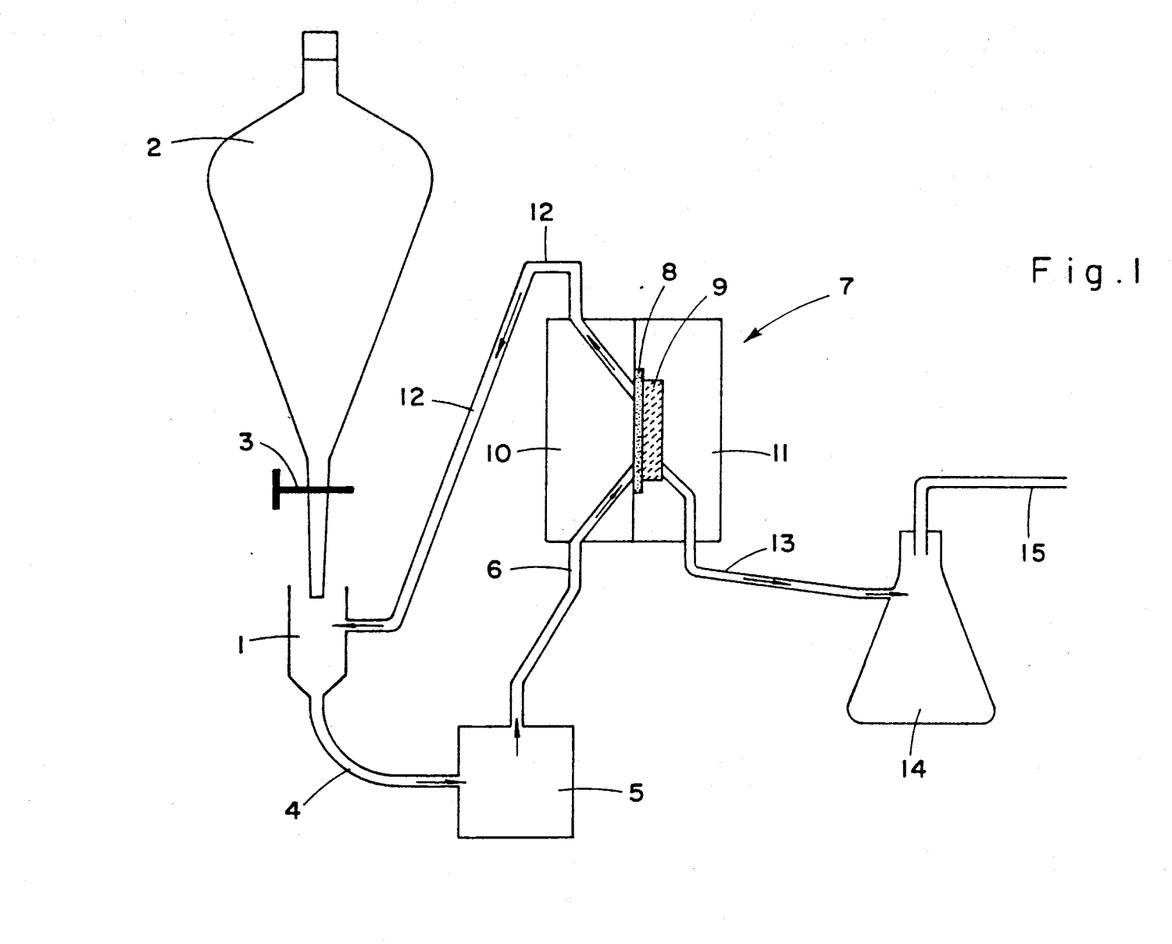
FIG. 1 is a diagrammatic presentation of a laboratory scale installation used in the performance of the water softening process according to the invention.

The laboratory scale installation for the performance of the process according to the invention shown in FIG. 1 comprises a column 1 on which is mounted a funnel-shaped vessel 2 fitted with a valve 3. The lower end of column 1 is linked by means of a duct 4 to a pump 5 which in turn is linked by a further duct 6 to the lower end of a microfiltration cell 7 having a filter unit comprising a flat microfiltration membrane 8 on a porous backing 9 and held between two matching panels 11 and 12. As shown, duct 6 leads into the lower end of the membrane 8 whose upper end is linked via a duct 12 to column 1. A duct 13 leads from the bottom zone of the porous backing 9 which is the filtrate collection side, to a flask 14 which is linked via a duct 15 to a vacuum pump (not shown).

In operation column 1 is filled with an aqueous calcium carbonate slurry to which fresh hard water containing a measured amount of alkaline such as NaOH is added. The slurry is circulated by means of pump 5 and vacuum is applied via tube 15. Soft water collects inside flask 14.

Figure 2:
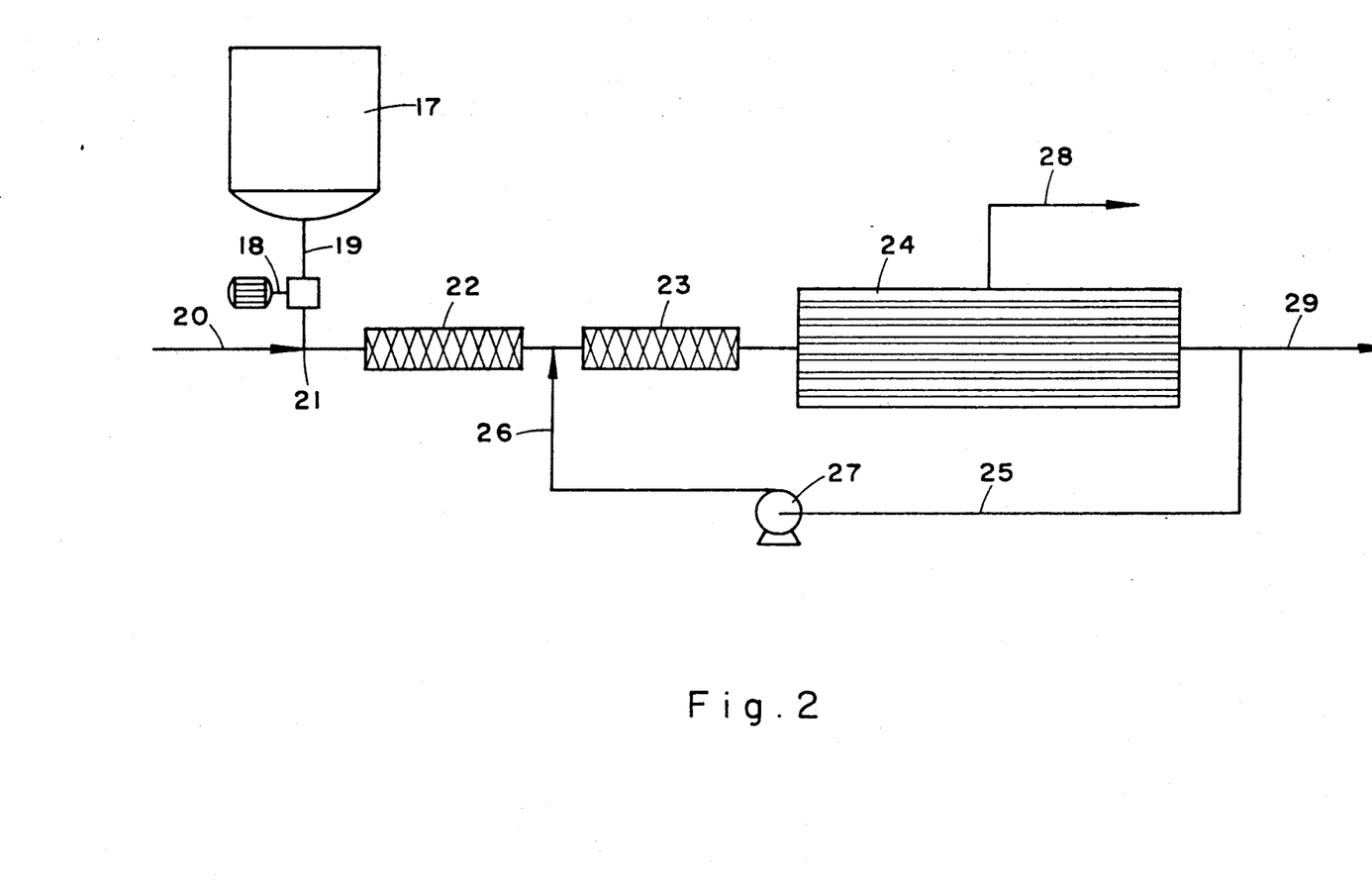
FIGS. 2 to 5 are diagrammatic presentations of installations for the industrial scale performance of the water softening process according to the invention.

The installation shown in FIG. 2 comprises a reservoir 17 of concentrated NaOH solution linked to a dozing pump 18 via a duct 19 which is joined to a fresh water main 20 at juncture 21.

The installation further comprises first and second static mixers 22 and 23 fitted each with a plurality of baffles, a microfiltration unit 24, a recycle ducting system 25, 26 with an online pump 27 and ducts 28 and 29 for the withdrawal of, respectively, soft water and a waste calcium carbonate slurry.

In operation, concentrated sodium hydroxide is dosed into the stream of hard fresh water entering via main 20 and the resulting alkaline mixture is charged into the static mixer chambers 22 and 23 in which intimate mixing is induced. In the microfiltration unit 24 clear soft water is separated from the calcium carbonate slurry and is withdrawn via duct 28, while the residual slurry of calcium carbonate is recycled via ducts 25 and 26 by means of pump 27, excess slurry being withdrawn as waste via duct 29.

Figure 3:
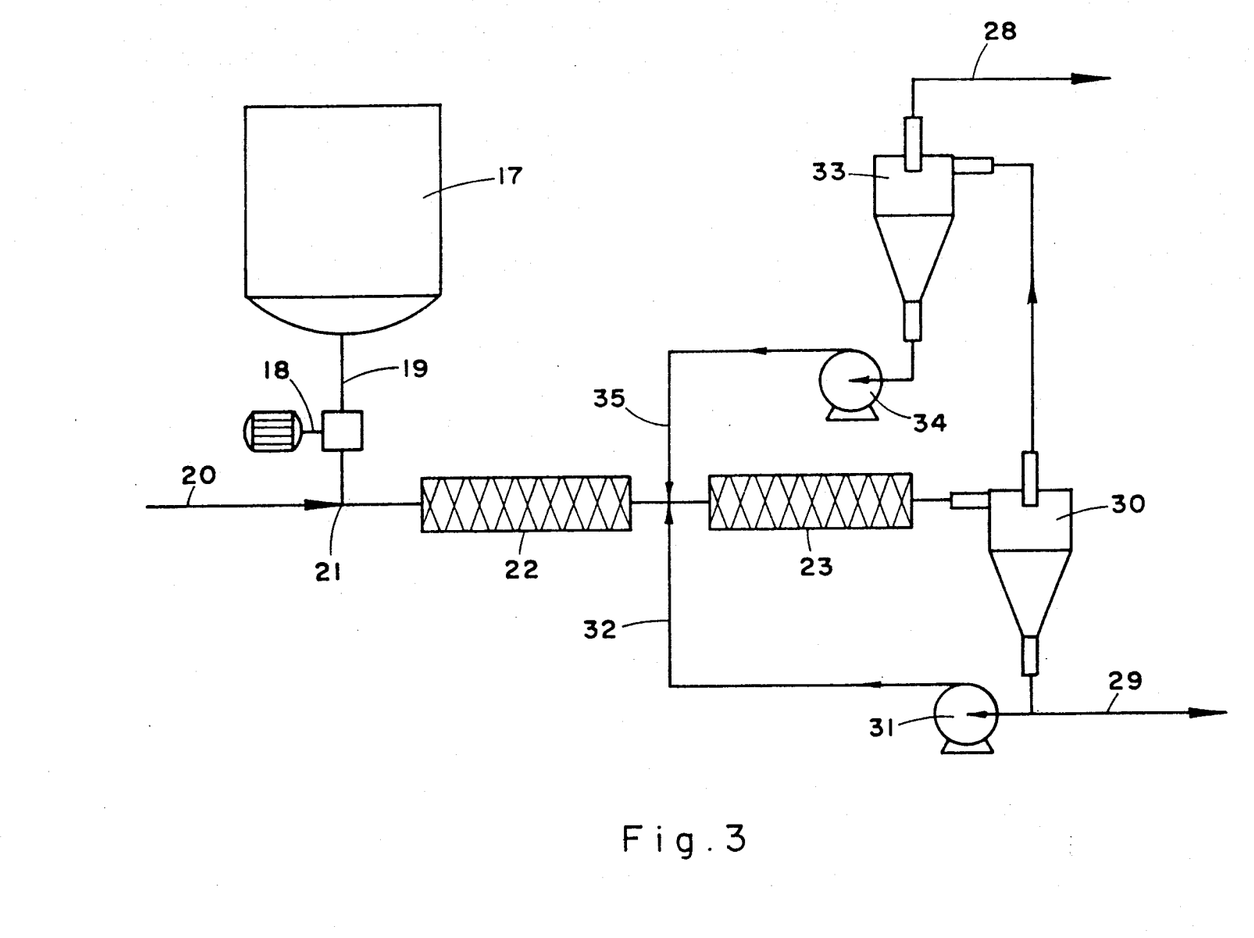

The installation of FIG. 3 is basically similar to that of FIG. 2 and corresponding parts are designated by the same numerals. Instead of the microfiltration unit 24 of the FIG. 2, this installation comprises a first cyclone 30 with an associated first pump 31 and a recycle duct 32, and a second cyclone 33 with associated pump 34 and a recycle duct 35.

In operation, the slurry withdrawn from the second static mixer 23 is separated in cyclone 30 into a dilute slurry and a concentrated slurry. The concentrated slurry is withdrawn by pump 31 and recycled via duct 32, any excess slurry being withdrawn as waste via duct 29. The dilute slurry from the first cyclone is charged into the second cyclone 33 where it is subjected to further separation. Any slurry separating inside the cyclone 33 is recycled by pump 34 via duct 35 while the clear soft water is withdrawn via duct 28.

In the installation of FIGS. 1-3 the contact between the circulating fine calcium carbonate crystals and the alkaline hard water occurs within the body of a flowing aqueous phase. By an alternative mode of operation, the circulating calcium carbonate crystals form a cake deposited on a filter, which cake is in dynamic equilibrium with an aqueous calcium carbonate slurry. Such mode of operation will now be described with reference to FIGS. 4 and 5.

Figure 4:
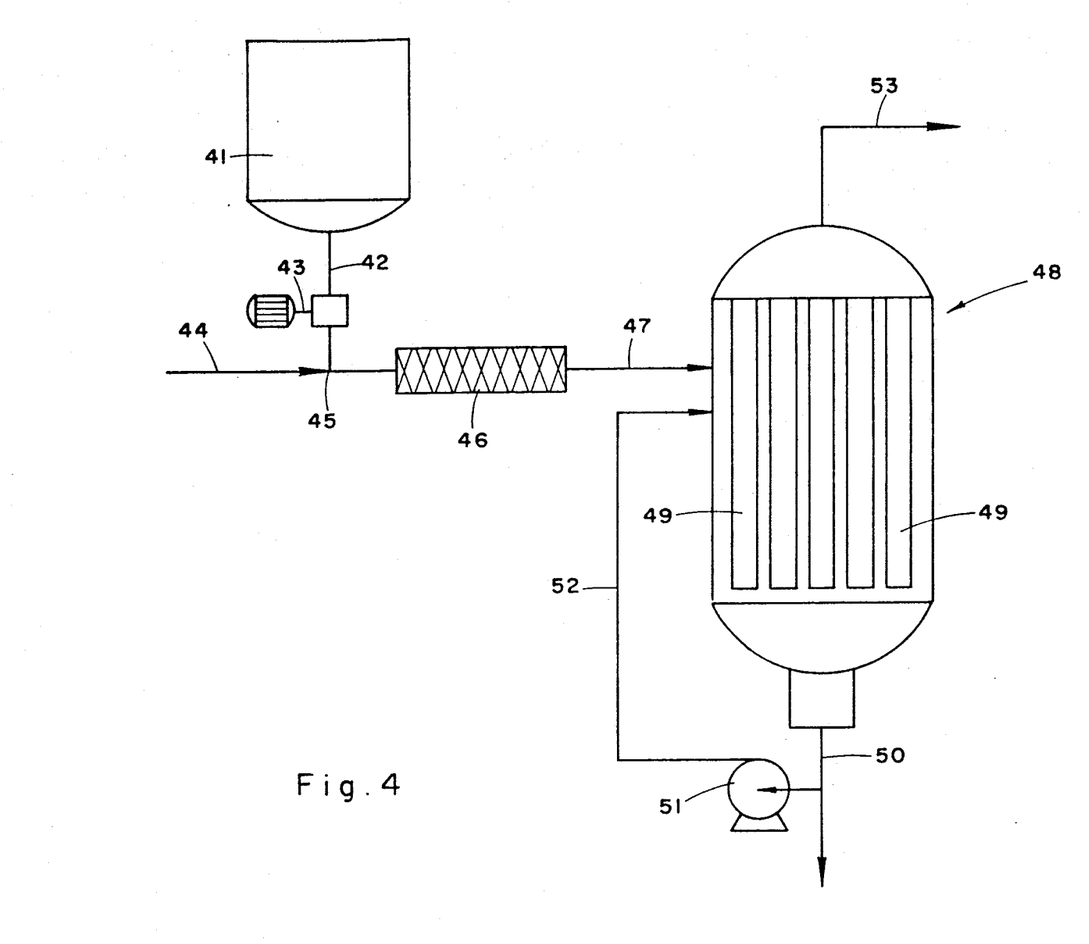

FIG. 4, shows an installation which comprises a reservoir 41 for concentrated sodium hydroxide solution, a duct 42 leading via a pump 43 to a fresh water main 44 and to which it is joined at juncture 45.

The installation further comprises a static mixer 46 linked by a duct 47 to a candle filter unit 48 having a plurality of parallel, dead-end filter tubes 49 coated each on the outside with a calcium carbonate layer consisting of crystals whose sizes are smaller than 100 microns.

The candle filter unit 48 comprises at its bottom end a discharge duct 50 for the withdrawal of a calcium carbonate slurry, a pump 51 and a precoating recycle duct 52, and at its top end a duct 53 for the withdrawal of soft water, which also serves for the periodic injection of a back pressure.

In operation, fresh hard water mixed with a dosed amount of sodium hydroxide is charged into the static mixer 46 and from there the mixture is charged via duct 47 into the candle filter unit 48. In unit 48 the supersaturated mixture is forced simultaneously through all the tubular filters 49 at a rate which ensures the required contact time of say 1-5 seconds. In consequence of this contact, calcium carbonate is induced to precipitate from the alkaline solution and the precipitate is retained on the cake. Clear soft water is withdrawn through duct 53.

In order to prevent an excessive growth of the calcium carbonate crystal coating on filter tube 49 in the course of operation, back pressure is periodically injected via the soft water withdrawal duct 53 whereby excessive calcium carbonate is released. Most of the released carbonate is recirculated by pump 81 via duct 51 and finds its way back to the coatings on filter tubes 49, while excessive calcium carbonate is withdrawn as waste via duct 50.

Figure 5:
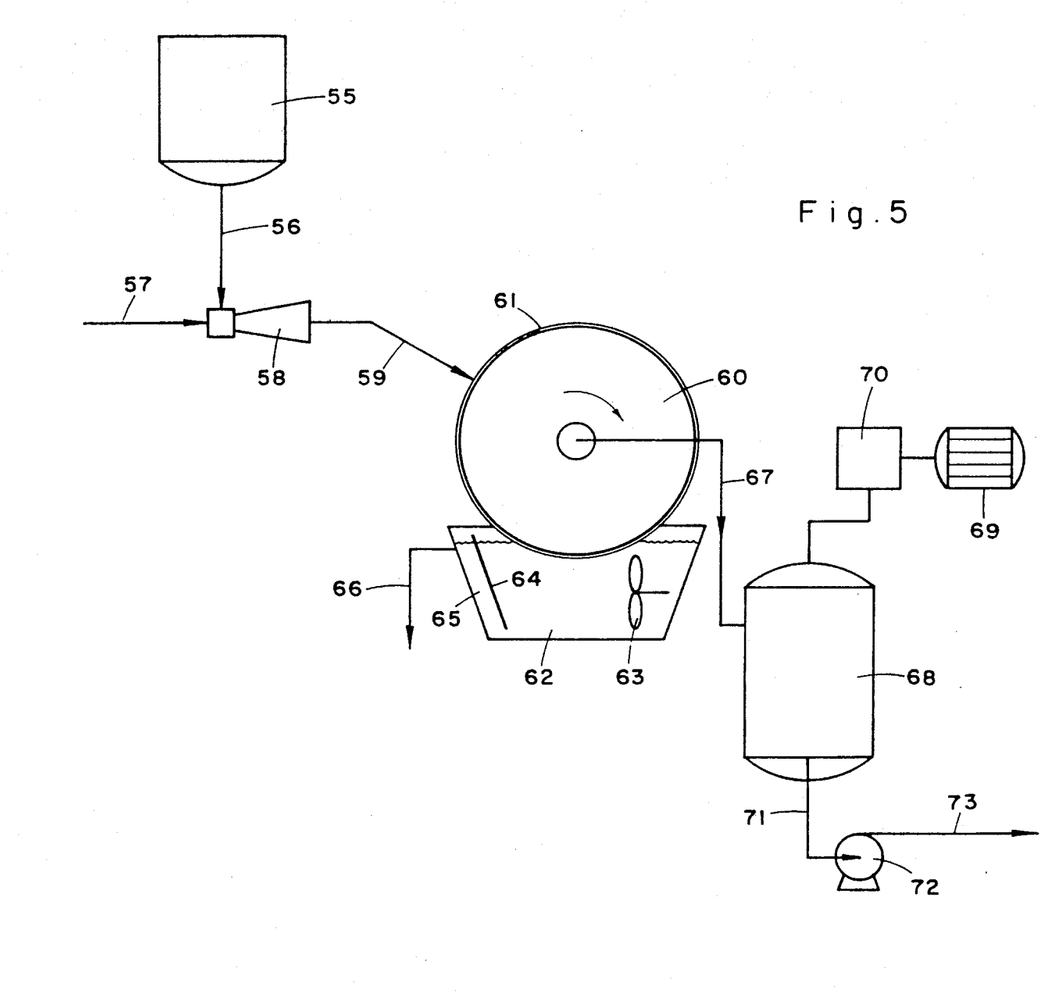

FIG. 5 shows an installation that comprises a reservoir 55 of concentrated sodium hydroxide solution linked via a duct 56 to a venturi mixer 58 which latter is also linked to a fresh water main 57. A duct 59, optionally fitted with a spray head, leads to a vacuum filter drum 60 comprising a calcium carbonate layer 61 with crystal having sizes ranging from 5 to 100 microns. Drum 60 with the calcium carbonate layer 61 dips into a vat 62 holding a calcium carbonate slurry and fitted with a stirrer 63, a partition 64 forming with the opposite wall of the vat a chamber 65, and an overflow discharge tube 66. The interior of drum 60 is linked via a duct 67 to a vacuum tank 68 which latter is connected to a vacuum pump 69 via a separator chamber 70. A pipe 71 leads from the bottom of tank 68 to a pump 72 connected to a soft water delivery duct 73.

In operation, drum 60 with the calcium carbonate layer 61 thereon revolves continuously clockwise and the supersaturated aqueous solution arriving from venturi mixer 58 is sprayed thereon. As the aqueous phase passes through the calcium carbonate layer 61, calcium carbonate in the aqueous phase is induced to precipitate and is retained on the filter. The calcium carbonate layer 61 is forced to fall into vat 62 when drum is in "three-o-clock" and "four-o-clock" positions, e.g. by an exterior doctor blade. Thereafter, when drum 60 is in the "five-o-clock" to "seven-o-clock" positions some of the calcium carbonate in the slurry inside vat 62 is sucked back in consequence of the vacuum inside the drum to recoat the filter and in this way the calcium carbonate crystals are recirculated. Excessive calcium carbonate is withdrawn as waste from chamber 65 by overflow via duct 66.

Soft water is withdrawn from the interior of drum 60 via duct 67 into vacuum tank 68 and is further withdrawn from there by pump 72 via duct 71 to be delivered as product soft water via delivery pipe 73.

The performance of the method according to the invention will now be further described in the following working examples.

EXAMPLE 1

A small cycle was built comprising a circulating pump, a microfiltration cell connected to vacuum and an open glass column and the necessary tubing as described hereinbefore with reference FIG. 1. An aqueous suspension 3% by weight was applied at the upstream surface of the microfiltration membrane. A mixture of hard water with an added amount of NaOH was added to the upper open end of the glass column so that the volume of the circulating suspension remained constant.

The circulating volume was 140 ml and a volume of 1.5 liter of hard water was added during approximately 4 minutes. Table 1 gives the $Ca^{2+}$ and $Mg^{2+}$ concentrations and pH of the filtered water, and the average contact time. For each experiment the contact time between treated water and precipitate, $t_c$, was calculated from the total time, $t_f$, required for the filtration, the volume $V_w$ of treated water, and the circulating volume $V_c$ by the following relation:

$$t_c = t_f \frac{V_c}{V_w}$$

$(Ca^{2+} + Mg^{2+})_0$ and $pH_0$ denote the starting hardness and pH, respectively of the hard feed water. The results show that an acceptable final hardness of 3 meq/l is reached at a pH as low as 8.28, well below the allowed upper limit of drinking water pH, with only 2.1 meq/l of NaOH and with a contact time as short as 32.6 seconds (experiment No. 8 in Table 1). In this mode of precipitation, $Mg^{2+}$ is not significantly coprecipitated with the $Ca^{2+}$, down to $Ca^{2+}$ concentrations of approximately 0.6 meq/l.

TABLE I

| Expt. Number | $(Ca^{2+} + Mg^{2+})$ meq/l | $(pH)_o$ meq/l | NaOH meq/l | $Ca^{2+} + Mg^{2+}$ meq/l | $Ca^{2+}$ meq/l | $Mg^{2+}$ meq/l | pH | Contact Time $T_c$ sec |
|---|---|---|---|---|---|---|---|---|
| 1 | 5.90 | 7.36 | 1.0 | 4.47 | 3.11 | 1.36 | 8.1 | 17.3 |
| 2 | 5.90 | 7.36 | 1.1 | 4.15 | 2.80 | 1.35 | 8.12 | 20.5 |
| 3 | 5.90 | 7.36 | 1.2 | 3.90 | 2.61 | 1.37 | 8.20 | 15.4 |
| 4 | 5.90 | 7.36 | 1.3 | 4.0 | 2.70 | — | 8.22 | 20.8 |
| 5 | 6.58 | | 1.4 | 4.47 | 3.03 | 1.44 | — | — |
| 6 | 6.7 | 7.2 | 1.9 | 3.64 | — | — | 8.02 | 32 |
| 7 | 6.7 | 7.2 | 2.0 | 3.41 | — | — | 8.20 | 16.8 |
| 8 | 6.7 | 7.2 | 2.1 | 3.22 | — | — | 8.28 | 32.6 |
| 9 | 6.58 | | 2.2 | 3.26 | 1.81 | 1.45 | 8.5 | 25.2 |
| 10 | 6.58 | | 2.57 | 2.74 | 1.33 | 1.41 | 8.90 | 24.3 |
| 11 | 6.58 | | 2.83 | 2.05 | 0.61 | 1.44 | 9.20 | 31.7 |

The results in Table 1 show that the variations of $Mg^{2+}$ are not significant and that accordingly $Mg^{2+}$ is not significantly coprecipitated.

To test the stability of the solutions, samples of the solutions softened water were heated to 60° C. for 5 minutes, in parallel with samples of the untreated hard water. In the non-treated hard water, heavy turbidity appeared upon heating while no precipitate appeared in the softened water.

In this and the following laboratory demonstrations no solids were removed from the cycle during the experiment.

EXAMPLE 2

A suspension of 25 gr precipitated $CaCo_3$ was filtered in a laboratory vacuum filter (diameter 9 cm), on Whatman #50 filter paper, creating a filter cake of about 3 mm thickness.

To 0.5 liter hard water, NaOH solution was added with stirring. The clear solution was immediately filtered through the filter cake. The rate of filtration was 3.3–4.0 ml/cm² per minute, at the vacuum maintained at half atmosphere. Assuming that half of the cake volume is an aqueous phase then each volume of 0.15 ml is in contact with the cake for about 2.5 seconds. This is an upper limit, since the volume of water in the cake is probably less than half.

The results are given in Table III. These results demonstrate the ability of small $CaCO_3$ crystals to induce a very fast precipitation of calcium cations from the water. The target softness of 3 meq/l of $Ca^{2+} + Mg^{2+}$ is achieved with 1.1 or 1.2 meq of NaOH resulting in soft water of relatively low pH of about 8.2.

The rate of filtration observed was of the order achieved in commercial microfiltration: 2 m³/m² hr.

TABLE II

| Experiment Number | FILTRATE $Ca^{2+} + Mg^{2+}$ meq/l | $Ca^{2+}$ meq/l | $Mg^{2+}$ meq/l | pH |
|---|---|---|---|---|
| 0 | 6.99 | 5.21 | 1.78 | 7.4 |
| 1 | 5.66 | 4.04 | 1.62 | 8.1 |
| 2 | 5.40 | 3.73 | 1.67 | 8.1 |
| 3 | 5.05 | 3.35 | 1.7 | 8.0 |
| 4 | 4.64 | 3.06 | 1.58 | 8.0 |
| 5 | 4.28 | 2.65 | 1.63 | 8.1 |
| 6 | 3.78 | 2.15 | 1.63 | 8.2 |
| 7 | 3.50 | 1.85 | 1.65 | 8.25 |
| 8 | 3.08 | 1.50 | 1.58 | 8.2 |
| 9 | 2.72 | 1.12 | 1.60 | 8.3 |

TABLE II-continued

| Experiment Number | FILTRATE $Ca^{2+} + Mg^{2+}$ meq/l | $Ca^{2+}$ meq/l | $Mg^{2+}$ meq/l | pH |
|---|---|---|---|---|
| 10 | 2.71 | 1.07 | 1.64 | 8.4 |
| 11 | 2.30 | 0.73 | 1.57 | 8.5 |
| 12 | 2.08 | 0.54 | 1.54 | 8.7 |

It can be concluded from the results that filtration through a $CaCO_3$ cake is very effective for fast crystallisation.

For the technological application the filter cake has to be periodically removed from the filter and renewed to avoid clogging. With each renewal some of the $CaCO_3$ precipitate has to be eliminated.

EXAMPLE 3

The laboratory cycle described in Example 1 was used for precipitation by $Na_2CO_3$.

It should be noticed that in the precipitation with $Na_2CO_3$ one equivalent of precipitant is required for the precipitation of one equivalent of $CaCO_3$, whereas with NaOH one equivalent of precipitant suffices for two equivalents (one mol) of $CaCO_3$.

A measured volume of 1N $Na_2CO_3$ solution was added to 2 liters of hard water, containing 6.1 meq/liter of Ca+Mg, at pH 7.2.

Water with added $Na_2CO_3$ was added to the circulating suspension of 3% $CaCO_3$ by weight. Softened water was filtered off through a microfiltration membrane by applying vacuum using a water pump. The results of these experiments which are shown in Table III demonstrate again that the target softening of drinking water, about 3 meq/lit., is achieved by the present process within tens of seconds when using $Na_2CO_3$ at relatively low pH.

TABLE III

| Experiment Number | $Na_2CO_3$ added meq/l | pH | $Ca^{2+} + Mg^{2+}$ meq/lit | Contact Time (sec) |
|---|---|---|---|---|
| 1 | 3.5 | | 3.4 | 51 |
| 2 | 4 | 8.3 | 3.08 | 26 |
| 3 | 4 | 8.3 | 2.78 | 57 |
| 4 | 5 | 8.6 | 2.3 | 24 |
| 5 | 6 | 8.8 | 1.8 | 25 |
| 6 | 7 | 9.2 | 1.55 | 29 |

EXAMPLE 4

To 500 ml of hard water a measured amount of 1N $Na_2CO_3$ was added. The clear solution was immediately filtered through a $CaCO_3$ cake formed on filter paper in a Buchner filter of 11 cm diameter. 60 gr of CaCO₃ was used.

Filtration time was about 90 sec. This filtration rate, about 2 m³/m², is satisfactory.

Ca+Mg in the tap water was: 7.31 meq/lit with a pH of 7.05.

After heating a sample of tap water for 5 minutes to 60° C. turbidity appeared. After filtering the concentration of (Ca+Mg) was 6.92 meq/lit and the pH was found to be 7.75.

TABLE IV

| Experiment Number | Na₂CO₃ added meq/l | FILTRATE pH | FILTRATE Ca + Mg meq/lit | FILTRATE AFTER HEATING pH | FILTRATE AFTER HEATING (Ca + Mg) meq/lit |
|---|---|---|---|---|---|
| 1 | 4 | 8.0 | 2.7 | | |
| 2 | 4.6 | 8.0 | 3.4 | 8.3 | 3.28 |
| 3 | 5 | 8.5 | 2.12 | | |
| 4 | 5.2 | 8.1 | 2.92 | 8.4 | 2.89 |

The contact time can again be estimated like in example 2 to be up to 6 sec.

Table IV shows that the target softening for drinking water, about 3 meq/lit, is achieved very fast, giving water of pH 8.0.

Some samples of softened water were heated for 5 minutes to 60° C. Very slight turbidity appeared, Ca+Mg was determined after filtration. These values and pH are given in the last two columns of Table IV. It is seen that from the softened water much less (Ca+Mg) was precipitated than from the untreated tap water.

We claim:

1. In a process for softening hard water, comprising adding a water soluble basic compound to the hard water to yield an alkaline hard water from which calcium carbonate is precipitated to yield a soft water which is recovered as a product, the improvement comprising providing a filter, flowing said alkaline hard water across said filter, wherein said alkaline hard water is clear and supersaturated with calcium carbonate, establishing intimate contact between said alkaline hard water and a cake of calcium carbonate crystals deposited on said filter to thereby induce precipitation of calcium carbonate from said alkaline hard water, wherein an amount of the calcium carbonate in said cake is in at least 50-fold excess over an amount of the calcium carbonate to be precipitated from said alkaline hard water and a size of individual calcium carbonate crystals in said cake does not exceed about 100 microns, disintegrating and reconstituting said cake deposited on said filter continuously or intermittently so as to obtain calcium carbonate precipitation within a time of about 2 to about 60 seconds.

2. A process according to claim 1, wherein said water soluble basic compound is selected from the group consisting of alkali metal hydroxides, sodium carbonate and calcium hydroxide.

3. A process according to claim 1, wherein said water soluble basic compound is sodium hydroxide.

4. A process according to claim 1, wherein the size of individual calcium carbonate crystals in said cake is from about 2 to about 20 microns.

5. A process according to claim 1, wherein said filter is a cross-flow filter.

6. A process according to claim 1, wherein said filter is a dead-end filter.

7. A process according to claim 1, wherein said filter comprises a rotating vacuum drum dipping into a vat holding a calcium carbonate slurry.

* * * * *